United States Patent [19]

Hansen

[11] Patent Number: 5,184,754
[45] Date of Patent: Feb. 9, 1993

[54] WEIGHT-CONTROLLED PARTICULATE MATTER FEED SYSTEM

[76] Inventor: Thomas N. Hansen, 1067 Southlake Rd., Middlesex, N.Y. 14507

[21] Appl. No.: 599,433

[22] Filed: Oct. 18, 1990

[51] Int. Cl.⁵ .............................................. B67D 5/08
[52] U.S. Cl. ...................................... 222/55; 177/50; 222/413; 222/56
[58] Field of Search ................... 209/55, 56, 63, 412, 209/413; 198/661, 657; 177/119, 121, 50

[56] References Cited

U.S. PATENT DOCUMENTS

| 2,000,958 | 5/1935 | Jarrier | 222/413 X |
| 2,549,908 | 4/1951 | Johansen | 222/56 X |
| 3,001,672 | 9/1961 | Wahl | 222/55 X |
| 3,508,683 | 4/1970 | Vander Schee | 222/55 |
| 3,702,128 | 11/1972 | Trotter et al. | 198/661 X |
| 3,804,298 | 4/1974 | Ricciardi | 222/56 |
| 3,897,868 | 8/1975 | Smith, Jr. | 222/55 X |
| 4,177,942 | 12/1979 | Häkkinen et al. | 222/413 X |
| 4,386,695 | 6/1983 | Olson | 198/661 |
| 4,391,561 | 7/1983 | Smith et al. | 198/661 X |
| 4,579,252 | 4/1986 | Wilson et al. | 222/55 |
| 4,729,442 | 3/1988 | Sichet | 222/55 X |
| 5,007,561 | 4/1991 | Wahl et al. | 222/55 |

FOREIGN PATENT DOCUMENTS 208157 7/1956 Australia .......................... 177/119

Primary Examiner—Donald T. Hajec
Attorney, Agent, or Firm—Charles S. McGuire

[57] ABSTRACT

A gravimetric system for feeding flowable, solid, particulate materials includes an open-topped trough receiving the material from a hopper at one end and discharging it from the other end at a desired rate in terms of weight per unit of time. The trough is formed in two, longitudinally aligned and continuous sections with a rotatable auger extending through the hopper and trough to move the material from the hopper to the discharge end of the trough. The first trough section is fixedly supported and the second section is supported at two spaced points on each side in an essentially frictionless manner by contact of pointed terminal ends of upwardly extending pins with conical recesses in blocks affixed to the sides of the second trough section. One pair of supports, one on each side of the second trough section remote from the end adjacent the first section, is connected to a load cell, whereby the weight of material in this portion of the trough is reflected in an electrical signal which controls the auger speed to adjust the rate of material feed to the desired discharge rate.

18 Claims, 4 Drawing Sheets

WEIGHT-CONTROLLED PARTICULATE MATTER FEED SYSTEM

BACKGROUND OF THE INVENTION

The present invention relates to systems for controlling the rate at which fluent, particulate materials are fed through a trough by an auger feed mechanism. More particularly, the invention relates to feed rate control systems responsive to the instantaneous weight of the delivered material at the discharge end of a trough.

Systems for controlling the feed rate of solid, fluent materials are generally classed as either volumetric or gravimetric. In a volumetric feed control system, probably the more common of the two, material is fed or dispensed in terms of volume per unit of time, e.g., cubic inches per minute, etc. Volumetric feeders are dependent on a consistent bulk density of the material for an accurate and uniform feed rate. If feeding at a uniform weight rate, e.g., lbs./hr., oz./min., g./min., etc., is required, a gravimetric system must be used. The present invention is a gravimetric type feed control system, assuring uniform weight distribution or constant weight rate independent of changing bulk density of the feed stock being dispensed.

Many, if not most, gravimetric feeders are of the so-called loss-in-weight type. In some, the material is fed via a belt, and in others by an auger or feed screw. Commonly, the weight of the supply hopper and its contents and sometimes the belt or auger as well, is noted at regular intervals and the feed rate (belt or auger speed) is adjusted as necessary to maintain the desired weight dispensing rate. Consequently, volumetric feed control is normally used while the hopper is being filled, or when there is significant shaking or machine vibration. This may cause appreciable errors when the feed stock is of very low density (e.g., less than 5 lbs./cu.ft.) and subject to changing bulk density, since significant fill time may be required for the relatively large hoppers necessary to handle sufficient weight of the low density material to register on a scale.

The large components required in loss-in-weight feeders for low density material cause such feeders to be very sensitive to external machine and building vibration. This vibration problem, coupled with the relatively long hopper fill time, requires operation in a volumetric control mode for times which are unacceptably long when dispensing dry solids with a variable density distribution.

It is a principal object of the present invention to provide a simple, reliable and accurate gravimetric control system for dispensing fluent, dry solids at a desired rate.

A further object is to provide a gravimetric feed control which is especially suited for use with low density feed stock, such as certain plastic materials which are commonly provided in a flakelike form prior to being formed with heat and pressure into disposable plates, and other articles.

Another object is to provide a novel and improved system for feeding particulate solids through an open-topped trough with an auger in a gravimetrically controlled manner.

Other objects will in part be obvious and will in part appear hereinafter.

SUMMARY OF THE INVENTION

The gravimetric feed control system includes a hopper of suitable capacity opening at its lower end into a substantially horizontal, open-topped trough having a fixedly supported section over a first portion of its length, extending from the hopper, and a suspended section over a second portion. A shaft carrying a feed screw or auger extends through the lower part of the hopper and the complete length of the trough. A variable speed servomotor is operatively connected to the shaft on the side of the hopper opposite the trough.

The suspended section of the trough is arranged end-to-end with the fixed section, providing a continuous trough extending linearly from the hopper to an open discharge end. The two trough sections are not directly attached to one another; the second section is suspended at two pairs of support points, one pair on opposite sides of the second section adjacent the first section, and another pair on opposite sides of the second section below a fixed support for a load cell. Essentially frictionless support is provided for the suspended section by upwardly extending pins, or sharp projections which establish substantially point contact with fixed blocks on the sides of the suspended section of the trough.

Variations in the weight of material in the suspended section of the trough are reflected in electrical signals from the load cell. The load cell signals are processed by appropriate, conventional circuitry and used to provide a control signal to the servomotor which drives the feed screw. As the signal varies on either side of a preselected set point, the speed of the motor, and thus the feed rate of the material, is increased or decreased as required. Other preferred features which contribute to enhanced operation of the system include the cross-sectional configuration of the trough, and a decreased diameter of the feed screw adjacent the discharge end.

The foregoing and other features of the invention will be more readily understood and appreciated from the following detailed description, taken in conjunction with the accompanying drawings, wherein:

DETAILED DESCRIPTION

Figure 1:
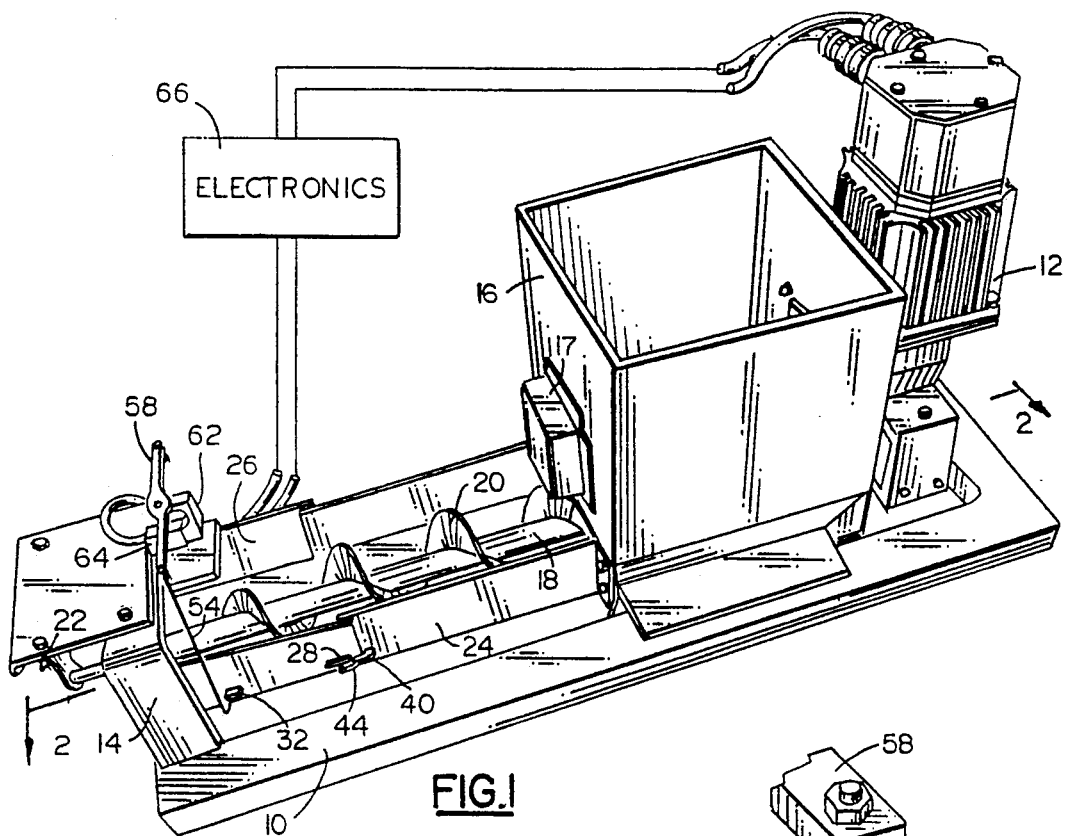
FIG. 1 is a partly diagrammatic, perspective view of the preferred embodiment of the system.

Referring now to the drawings, the material feeding and feed rate control system of the invention, as seen in FIG. 1, includes both mechanical and electrical/electronic elements. As will later become apparent, electrical signals are generated as a function of the weight of the feed stock or material present at any given time in a portion of the feed system. These signals are supplied to and processed by conventional electronic components, including microprocessor chips. Given the operational characteristics and requirements of the apparatus, design of circuitry suitable for implemeting the desired control functions is within the purview of those skilled in the art.

Elements of the apparatus are mounted upon a stable base 10, having a U-shaped configuration in plan view. Servomotor 12 is bolted to the closed end of base 10 and arch 14 is welded or otherwise secured to, and extends above, the open end. Hopper 16, for holding a supply of the material to be fed at a gravimetrically controlled rate by the system of the invention, is also fixedly secured to base 10. Conventional, ultrasonic level detectors 17 may be affixed to the sides of hopper 16 to monitor the level of material therein. Shaft 18, carrying a continuous, helical feed screw or auger 20, is engaged at one end with the rotary drive means of motor 12 and rotatably supported at the other end by fixed plate 22, attached to and extending downwardly from arch 14.

Figure 2:
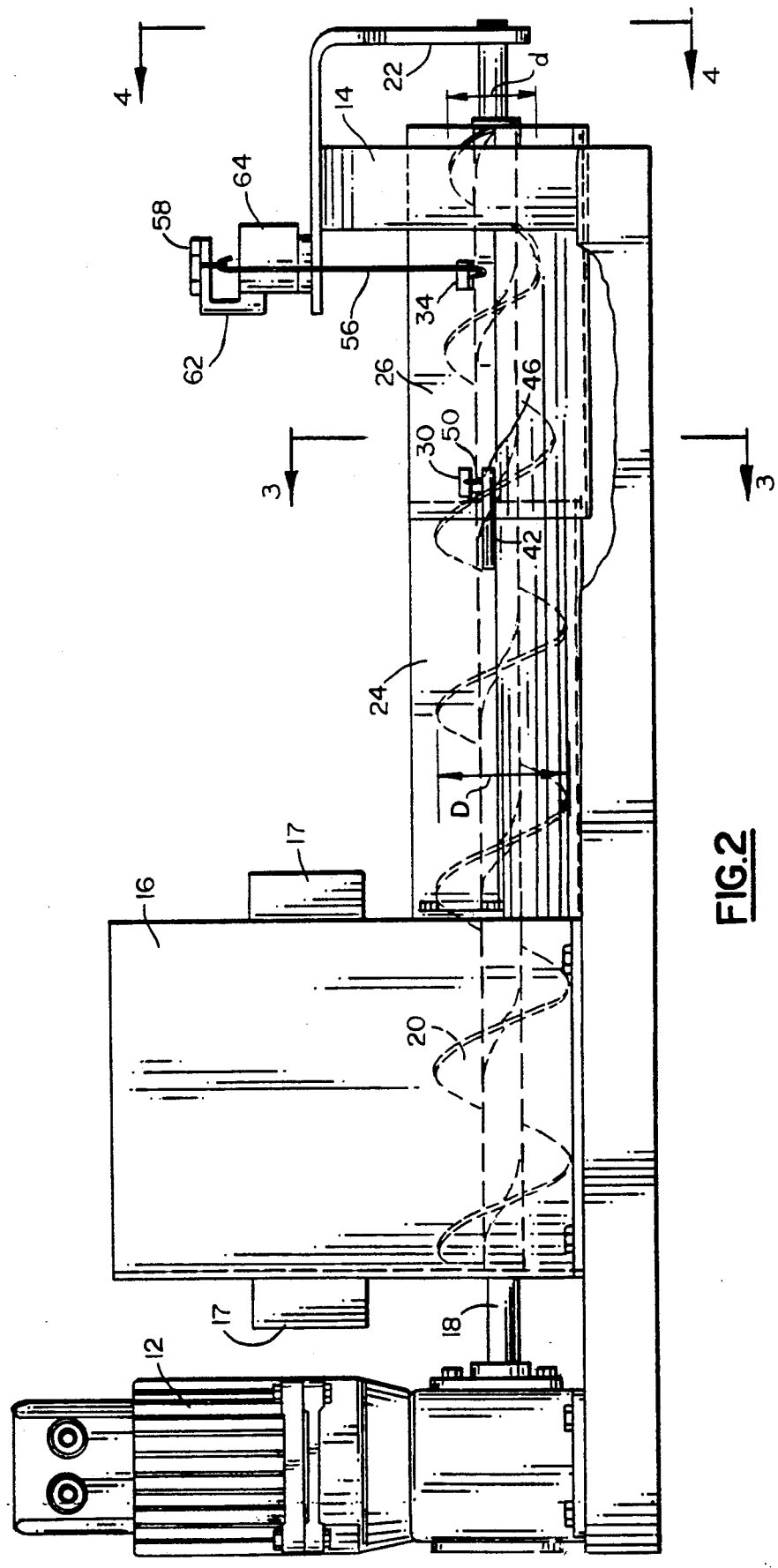
FIG. 2 is a side elevational view of the apparatus of FIG. 1.

As best seen in FIG. 2, shaft 18 extends from its driven end through a side wall of hopper 16, and thence through the lower part of the hopper and along the entire length of a two-section trough. The trough is open at its top and both ends, one of which communicates with the interior of hopper 16 through an opening in a side wall thereof. A first section 24 of the trough is fixedly attached to hopper 16, and may also be directly supported by base 10. The second section 26 of the trough is suspended at four points in a manner providing essentially frictionless support, as explained later in more detail. Trough sections 26 and 28 overlap for a short distance at their adjoining ends, the end of first section 24 fitting within the end of section 26.

Figure 4:
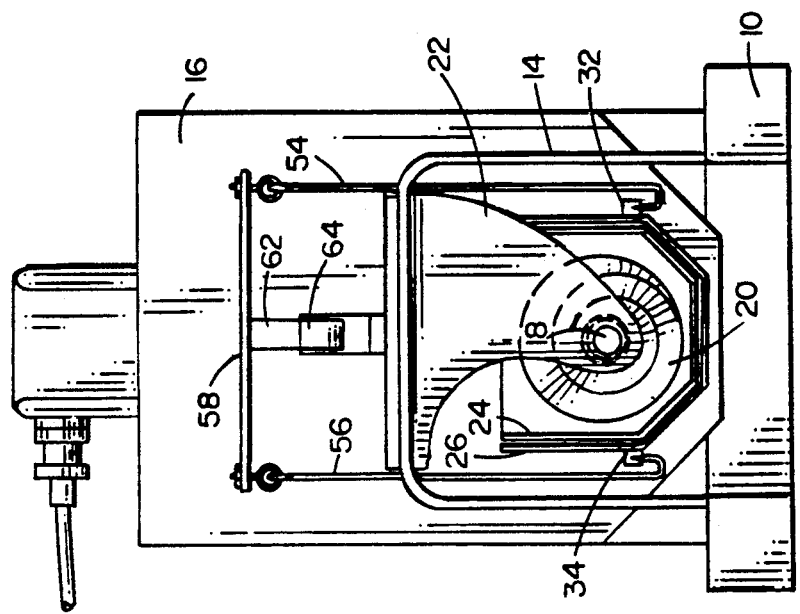
FIG. 4 is an end view of the apparatus as seen from the line 4—4 of FIG. 2.
Figure 3:
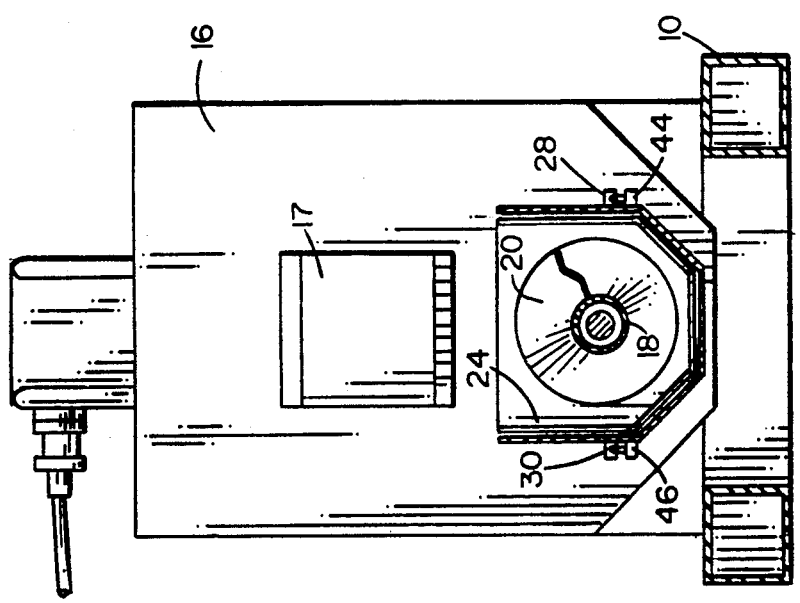
FIG. 3 is an end elevational view, in section on the line 3—3 of FIG. 2.
Figure 5:
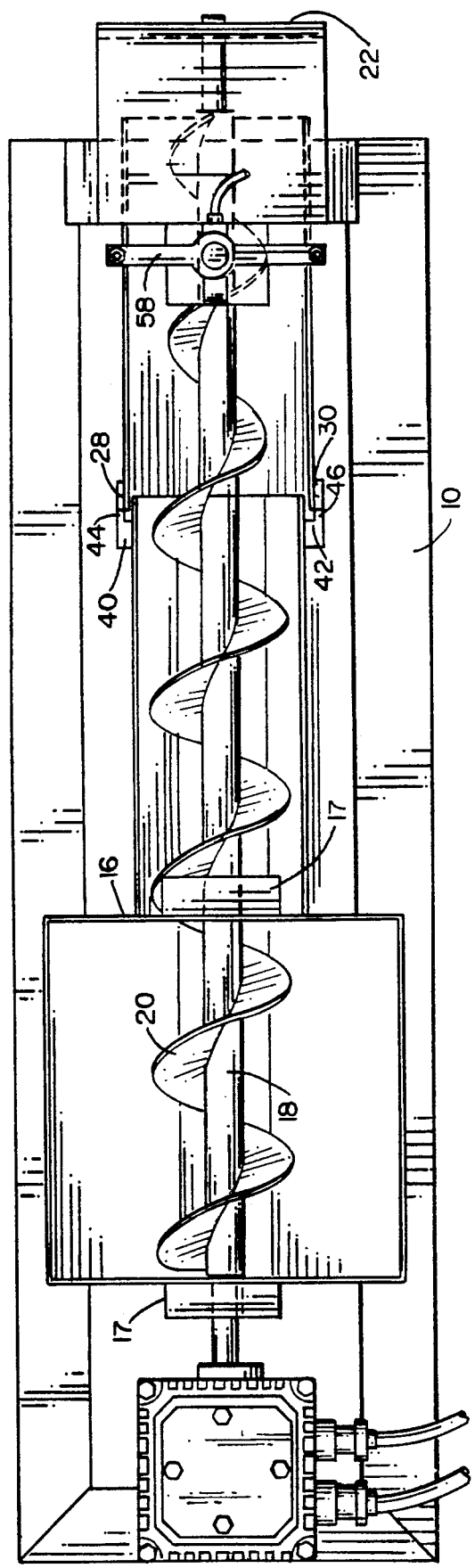
FIG. 5 is a top plan view.

The preferred cross-sectional configuration of trough sections is shown in FIGS. 3 and 4; it will be noted that the sections include vertical side walls, joined to a horizontal bottom wall by a pair of walls arranged at substantially 45° with respect to the side and bottom walls. Also, as best seen in FIGS. 2, 4 and 5, the outer diameter encompassed by the helical plate forming auger 20 tapers from maximum to minimum diameters D and d, respectively (FIG. 2), preferably over the last 1 to 1½ revolutions of the auger around shaft 18 at the discharge end. These two features, i.e., the configuration of the trough walls, and the smaller diameter at the discharge end of the auger, contribute to a uniform, steady flow rate, particularly of certain low-density materials, such as certain plastics which have been chopped or shredded into small, flakelike particles. It has been found that such particles tend to stick to the sides of the usual trough of semi-circular cross section, a condition which is essentially eliminated by the trough disclosed herein. Also, an undesireable tendency of such particles to clump together at the discharge end of the auger is effectively prevented by reducing the diameter of the auger in the area adjacent the discharge end.

Figure 6:
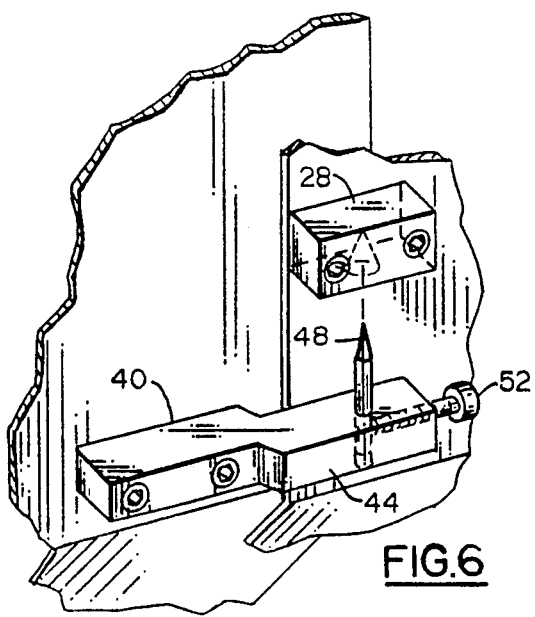
FIGS. 6 and 7 are enlarged, fragmentary, perspective views of portions of the apparatus.
Figure 7:
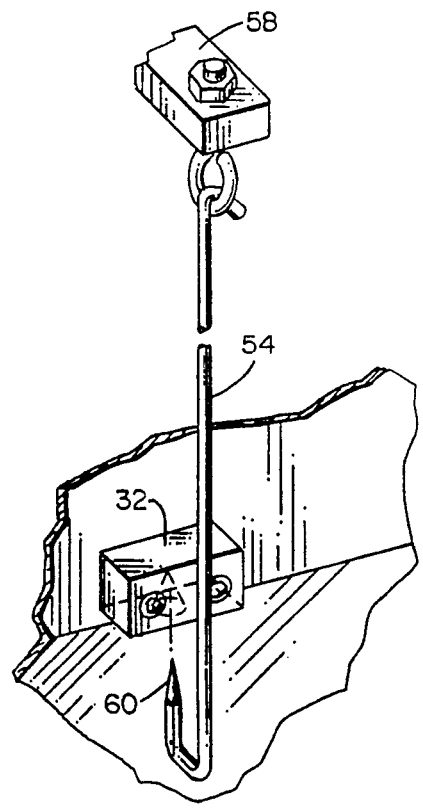

Turning now to the manner of suspension of trough section 26, a first pair of blocks 28 and 30 are attached to opposite sides of section 26 at the end which overlaps section 24. A second pair of blocks 32 and 34 are attached to the opposite sides at positions nearer the discharge end of section 26 than to blocks 28 and 30. Each of blocks 28, 30, 32 and 34 have a conical recess extending into the lower side thereof. Recesses 36 and 38 in blocks 28 and 32, respectively, are seen in the enlarged details of FIGS. 6 and 7, the recesses in blocks 30 and 34 being the same.

A third pair of blocks 40 and 42, having outwardly offset arms 44 and 46, respectively, are attached to trough section 24 adjacent its overlap with section 26. Pins 48 and 50, having sharply pointed ends, extend upwardly from arms 44 and 46. Preferably, pins 48 and 50 are vertically adjustable, as by being slideably received in openings in arms 44 and 46, and maintained in the desired position by set screws, such as that shown in FIG. 6 and denoted by reference numeral 52. Elongated rods 54 and 56 extend downwardly from hooked connections at opposite ends of crossbar 58. The lower ends of rods 54 and 56 are bent 180° to terminate in upwardly directed, sharply pointed ends, as indicated at 60 in FIG. 7.

Crossbar 58 is affixed to the upper portion of C-shaped member 62 (FIG. 2), the lower end of which is attached to conventional mechanical-electric transducer or load cell 64, supported on arch 14. Pins 48 and 50 are placed in the recesses in blocks 28 and 30 to support the end of trough section 26 adjacent section 24. The upwardly directed, pointed ends of rods 54 and 56 are received in the recesses in blocks 32 and 34, thereby suspending the remainder of section 26 in a manner causing its weight and the weight of its contents to be transmitted via rods 54 and 56, crossbar 58 and member 62 to load cell 64. Thus, load cell 64 generates an electrical signal proportionate to the fixed weight of trough section 26 and the variable weight of the material therein.

The electrical signal from load cell 64 is supplied to an appropriate electronics package, indicated diagrammatically in FIG. 1 by block 66, of conventional design. The load cell signal provides a control for a signal supplied from electronics package 66 to servomotor 12 to vary the speed thereof in inverse proportion to the variation in the load cell signal from a desired set point. The weight of material discharged from trough section 26 per unit of time, i.e., the gravimetric feed rate, is a function of the rotational speed of motor 12 and the amount of material in section 26 at any given time. If the amount (weight) of material in trough section 26 becomes greater than that required to discharge material at the desired rate for the current motor speed, the motor speed is reduced to a level which will provide the desired feed rate. That is, a higher load cell signal, reflecting the greater weight of material in section 26, is processed by electronics 66 to provide a lower speed control signal to motor 12, and vice versa.

The "frictionless" support means for the discharge section of the feed trough and its connection to the load cell provide a highly stable and reliable, gravimetric feed rate control system for fluent solids. Configuration of the feed trough and auger also enhance the system's performance, particularly when used to deliver materials of low bulk density such as recycled plastics which are in a ground, chopped or shredded, flakelike form. It is also preferred that the suspended section of the trough be relatively short in order to enhance response of the system. For example, in a system designed specifically to handle ground styrene foam, having a bulk density of about 1.8 lbs./ft$^3$, the fixed and suspended sections of the trough were about 9¾" and 7¼" in length, respectively. Blocks 32 and 34 were positioned with the recesses about 3" from the discharge end of trough section 26. The trough sections were about 4½" deep, and the auger had maximum and minimum diameters (D and d) of about 3½" and 2½", respectively, tapering from the maximum to the minimum over about the last 2 revolutions around the shaft. Also, the pitch of the auger is preferably such that the portion of the auger in that portion of trough section 26 in which the weight of material is applied to load cell 64 comprises about 1 to 1½ revolutions of the auger around the shaft.

Although the disclosed system is particularly effective in overcoming problems normally encountered in gravimetric feed systems for low bulk density solids, it is by no means limited to applications involving such materials. The system described in the above example may also be used to supply material such as oriented polystyrene (20 lbs./ft$^3$) or resin pellets used in injection molding (38-40 lbs./ft$^3$).

What is claimed is:

1. A gravimetric feed system for delivering particulate material from a supply thereof to a discharge location at a desired rate in terms of weight per unit of time, said system comprising:
   a) a substantially horizontally disposed trough including first and second sections, aligned along a linear axis, said first section being fixedly supported with a first end receiving said material from said supply and second end discharging said material into a first end of said second section, said material being discharged from a second end of said second section at said desired rate;
   b) auger means disposed within said trough and extending along both of said first and second sections, said auger means being rotatable to move said material through said trough from said first section first end to said second section second end;
   c) first support means for supporting said first trough section independently of said second trough section;
   d) transducer means responsive to weight applied thereto for generating an electrical signal having a value commensurate with said weight;
   e) second support means for supporting said second trough section with essentially frictionless engagement between said second support means and said second trough section;
   f) means connecting said second support means with said transducer means to apply at least a portion of the weight of said second trough section and the contents thereof to said transducer means; and
   g) variable speed rotary drive means for said auger means, said drive means having a speed responsive to said electrical signal value and so related thereto that the speed of rotation of said auger means, and thus the rate of delivery of said material to said discharge location in terms of weight per unit of time, corresponds essentially to said desired rate.

2. The invention according to claim 1 wherein said second support means comprise essentially point contact means for supporting said second trough section at a plurality of points.

3. The invention according to claim 2 wherein said point contact means comprise the sole support for said second trough section.

4. The invention according to claim 3 wherein said point contact means comprise a first plurality of elongated members extending along a vertical axis with pointed terminal ends contacting a respective first plurality of contact elements for supporting said first end of said second trough section relative to said second end of said first trough section, and a second plurality of elongated members extending along a vertical axis with pointed terminal ends contacting a respective second plurality of contact elements for supporting said second trough section at a position remote from said first end thereof relative to said connecting means.

5. The invention according to claim 4 wherein each of said first plurality of elongated members is fixedly connected to said first trough section adjacent said second end thereof, and each of said first plurality of contact elements is fixedly attached to said second trough section adjacent said first end thereof.

6. The invention according to claim 4 wherein each of said second plurality of elongated members extends integrally from a portion of said connecting means, and each of said second plurality of contact elements is fixedly attached to said second trough section at said position remote from said first end of said second trough section.

7. The invention according to claim 6 wherein said connecting means comprise a crossbar connected to and extending laterally outwardly from said transducer means, and a pair of rods respectively extending downwardly from opposite ends of said crossbar, said second plurality of elongated members extending integrally from said rods.

8. A gravimetric feed system for supplying flowable, solid products from a supply to a discharge location at a controlled rate in terms of weight of discharged product per unit of time, said system comprising:
   product containment means including first and second, elongated sections aligned along a linear axis and each having walls defining a horizontally disposed bottom, lateral sides and first and second ends;
   b) a rotatable auger for moving said product through said containment means from said first end and discharging it from said second end at a rate proportional to the speed of movement of said auger, said auger having a central shaft and a helical blade of predetermined diameter and pitch, said auger being at least partly disposed within said containment means and extending between said first and second ends thereof;
   c) fixed hopper means for receiving said solid products, said auger shaft extending from a proximal end connected with said drive means, through said hopper means, and through said containment means, along said linear axis, to a distal end;
   d) means supporting said second section of said containment means at a plurality of positions solely by essentially point contact between said supporting means and said containment means, said first section being fixed with respect to said hopper means;
   e) transducer means responsive to weight applied thereto to generate an electrical signal having a value commensurate with said weight;
   f) means structurally connecting at least one of said supporting means with said transducer means to apply at least a portion of the weight of said second section and the contents thereof to said transducer means; and
   g) variable speed drive means for moving said feed means, said drive means having a speed responsive to said electrical signal value and so related thereto that the speed of movement of said feed means, and thus the rate of delivery of said material to said discharge location in terms of weight per unit of time, corresponds substantially to said desired rate.

9. The invention according to claim 8 wherein the position of said one of said supporting means is closer to said second end of said containment means than any others of said plurality of positions.

10. The invention according to claim 8 wherein said containment means comprises an open-topped trough having a substantially flat, horizontal, bottom wall, a pair of spaced, vertical side walls and inwardly slanting wall sections joining each of said side walls with said bottom wall.

11. The invention according to claim 8 wherein said blade diameter is smaller for a first portion of the length of said auger extending from said distal end than in the portion extending from said proximal end.

12. The invention according to claim 8 wherein said predetermined pitch of the part of said helical blade positioned in said portion of said containment means is such that not more than about 1½ revolutions of said blade about said shaft are positioned in said portion of said containment means.

13. The invention according to claim 8, wherein said drive means comprises a variable speed electrical servo motor.

14. The invention according to claim 13 wherein said transducer means comprises a load cell.

15. The invention according to claim 8 wherein said supporting means comprise a first pair of elongated members extending along a vertical axis with pointed terminal ends contacting a respective first pair of contact elements, one of said first pair of elongated members and said first pair of contact elements being fixedly connected to said second section of said containment means and the other of said first pairs being fixedly supported with respect to said first section of said containment means, and a second pair of elongated members with pointed terminal ends contacting a respective second pair of contact elements, one of said second pair of elongated members and said second pair of contact elements being fixedly connected to said second section of said containment means and the other of said second pairs being connected to said connecting means.

16. The invention according to claim 15 wherein each of said first and second pairs of contact elements comprise block-like members, one of each pair being fixedly connected to the exterior of ne of said lateral sides of said containment means walls.

17. The invention according to claim 16 wherein each of said block-like members includes a substantially conically shaped recesses, open at the bottom, and said first and second pairs of elongated members comprise pin-like elements extending into said recesses with said pointed terminal ends contacting the apices of said conical recesses.

18. A gravimetric feed system for supplying flowable, solid products from a supply location to a discharge location at a controlled rate in terms of weight of discharged product per unit of time, said system comprising:
 a) product containment means including first and second, elongated sections aligned along a linear axis and each having walls adapted to contain said product as it is moved through said containment means;
 b) movable feed means for moving said product through said containment means from said first end and discharging it from said second end at a rate proportional to the speed of movement of said feed means;
 c) means supporting said second section of said containment means at a plurality of positions solely by essentially point contact between said supporting means and said containment means, said first section being fixed with respect to said supply location;
 d) transducer means responsive to weight applied thereto to generate an electrical signal having a value commensurate with said weight;
 e) means structurally connecting at least one of said supporting means with said transducer means to apply the weight of at least a portion of said section, said second section of said containment means and the contents thereof to said transducer means; and
 f) variable speed drive means for moving said feed means, said drive means having a speed responsive to said electrical signal value and so related thereto that the speed of movement of said feed means, and thus the rate of delivery of said material to said discharge location in terms of weight per unit of time, corresponds substantially to said desired rate.

* * * * *